United States Patent [19]
Erickson et al.

[11] 3,772,964
[45] Nov. 20, 1973

[54] NULL AND GAIN ADJUSTMENT MECHANISM AND PROCEDURE FOR HYDROSTATIC CONTROL SYSTEMS

[75] Inventors: Rodney R. Erickson, Joliet, Ill.; Ralph W. Matthews, New Berlin, Wis.

[73] Assignee: Caterpillar Tractor Co., Peoria, Ill.

[22] Filed: Dec. 23, 1971

[21] Appl. No.: 211,318

[52] U.S. Cl. .................. 91/411, 91/413, 251/233, 251/234
[51] Int. Cl. .................. F15b 11/16, F15b 13/06
[58] Field of Search ............. 91/411, 413; 74/469; 251/285, 78, 233, 234; 137/609, 637.1

[56] References Cited
UNITED STATES PATENTS
| | | | |
|---|---|---|---|
| 971,764 | 10/1910 | Lutz | 74/522 |
| 1,751,172 | 3/1930 | Reinhardt | 251/78 X |
| 2,274,029 | 2/1942 | Archer | 251/285 X |
| 3,158,173 | 11/1964 | Bachli et al. | 251/78 X |
| 3,477,225 | 11/1969 | Cryder et al. | 60/19 |
| 3,575,378 | 4/1971 | Fawkes | 251/233 |
| 3,307,583 | 3/1967 | Harter | 251/233 |

*Primary Examiner*—Irwin C. Cohen
*Attorney*—Freling E. Baker

[57] ABSTRACT

There is disclosed a control system for interconnecting a plurality of hydrostatic transmissions for synchronous operation. The control system includes means to adjust the null position of the pumps and motors and means to adjust the gain between the two machines.

4 Claims, 3 Drawing Figures

NULL AND GAIN ADJUSTMENT MECHANISM AND PROCEDURE FOR HYDROSTATIC CONTROL SYSTEMS

BACKGROUND OF THE INVENTION

This invention relates to control means and pertains more particularly to control means for synchronizing the output of a plurality of hydrostatic transmissions.

Hydrostatic transmissions are now being employed in heavy duty vehicles wherein steering is accomplished by differential drive of the wheels by separate hydrostatic drive transmissions. Such a drive system is disclosed in U.S. Pat. No. 3,477,225 issued Nov. 11, 1969 to J.R. Cryder, et al., and assigned to the assignee of the present invention.

Hydrostatic transmissions normally employ a hydraulic pump supplying pressurized fluid to a hydraulic motor connected to supply torque to the drive wheels. Either the pump, the motor, or both may be variable.

When hydrostatic transmissions are used in vehicles such as track laying vehicles and two wheeled tractors, steering is normally accomplished by varying the drive to each side of the vehicle rather than braking either side as in previously known systems. Such systems normally employ separate hydraulic motors for each side of the vehicle. These motors may be supplied by a single pump or from separate pumps. In either case, either the motors or the pump must be variable in order to effect steering.

One problem with such systems having either one or two pumps, and two motors is in providing a control system having provision for precise synchronism between the drive motors. The need for synchronism is especially critical when the steering control is in the neutral position for movement of the vehicle in a straight line. Without precise adjustments or position correspondence of the pump and/or motors, the vehicle will not travel in a straight line.

SUMMARY OF THE INVENTION

It is the primary object of the present invention to provide control means for adjusting the null and gain characteristics of a hydrostatic control system.

Another object of the present invention is to provide control means for interconnecting a plurality of hydraulic machines for position correspondence.

A further object of the present invention is to provide control means for adjustably interconnecting the servo control valves of a plurality of hydraulic machines.

Still another object of the present invention is to provide adjustable control means to provide for corresponding output from a pair of hydrostatic transmissions.

In accordance with the present invention, an adjustable linkage is provided between the servo valves of a pair of pumps and/or motors in a pair of hydrostatic transmissions to provide corresponding outputs from the transmissions for a given control setting.

BRIEF DESCRIPTION OF THE DRAWINGS

The above and other objects and advantages of the present invention will become apparent from the following description when read in conjunction with the accompanying drawings wherein.

DETAILED DESCRIPTION OF PREFERRED EMBODIMENTS

Figure 1:
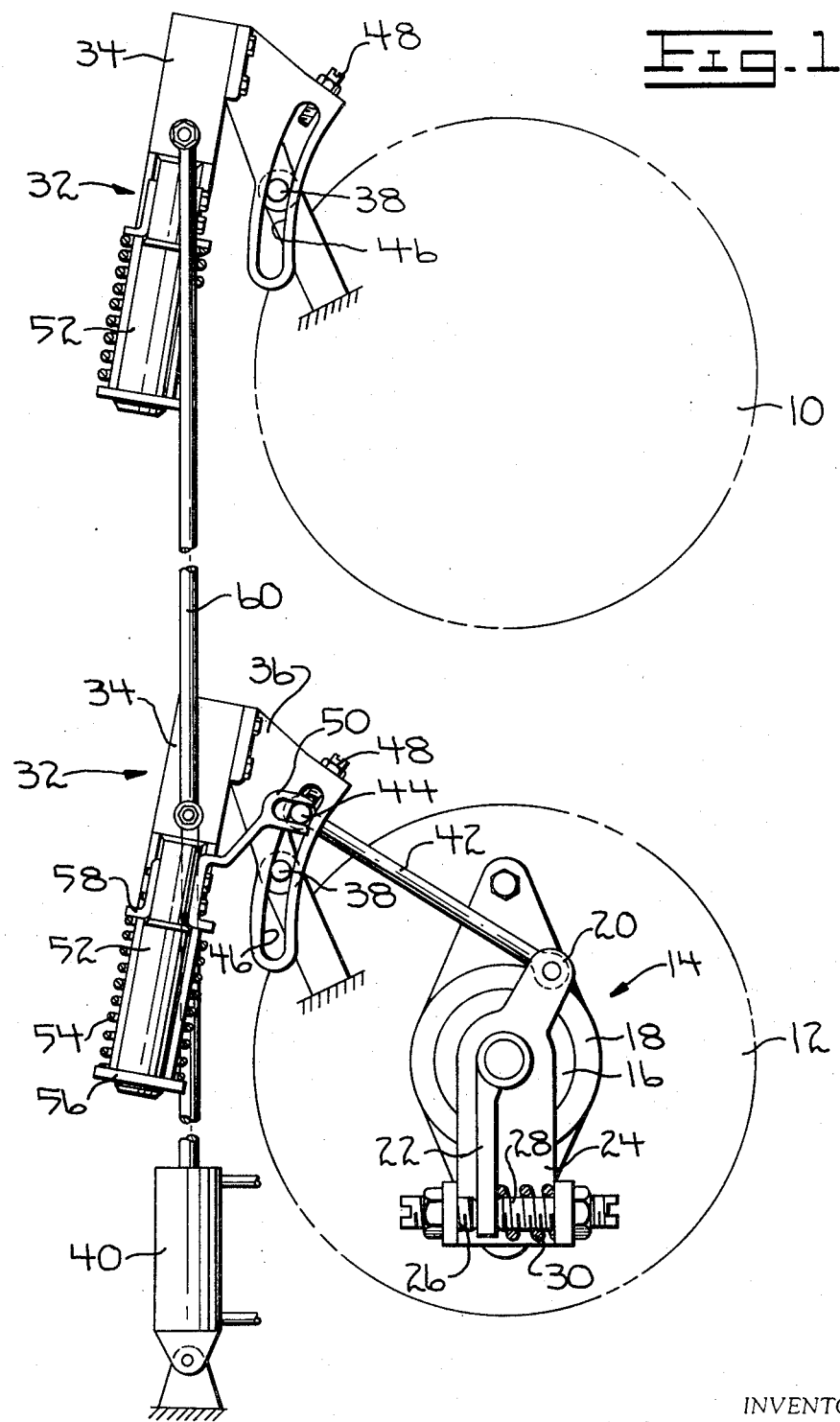
FIG. 1 is a diagrammatic illustration of a preferred embodiment of the present invention.
Figure 2:
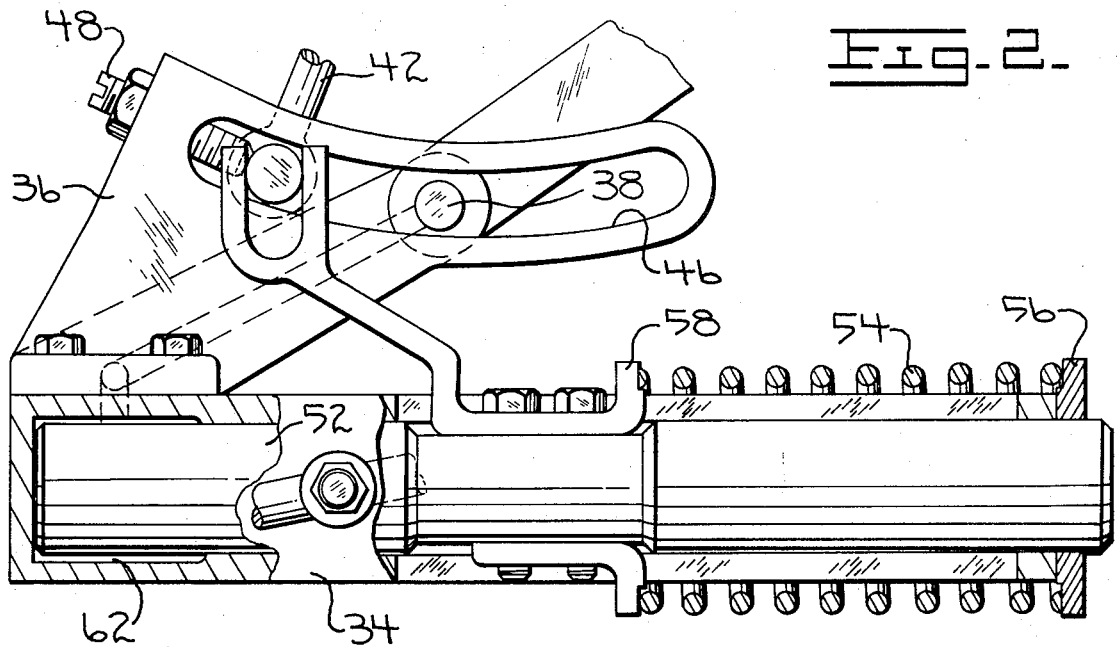
FIG. 2 is a detailed illustration of a portion of the embodiment of FIG. 1; and, FIG. 3 is an elevational view of a pivotal support bracket for the present invention.
Figure 3:
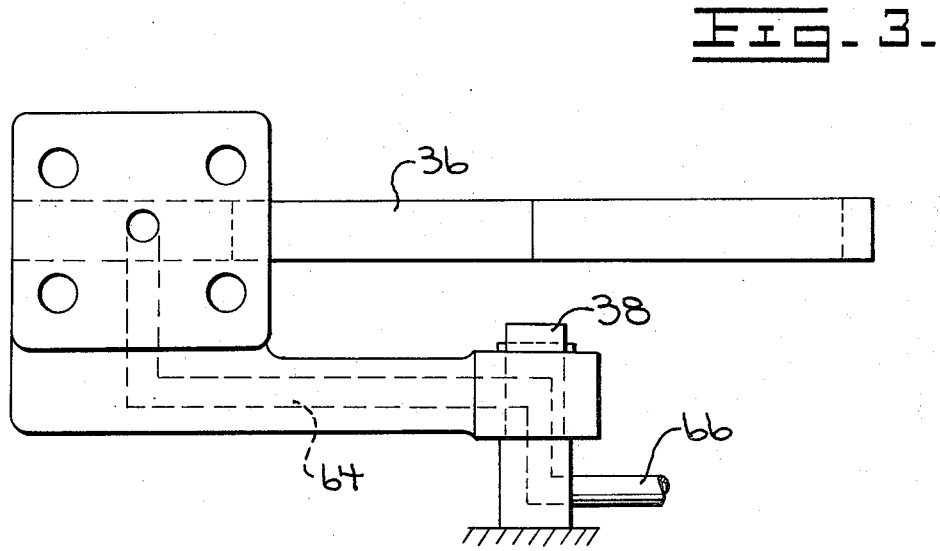

Referring now to the drawings, and in particular to FIG. 1, there is schematically illustrated a pair of variable displacement hydraulic machines 10 and 12 which may be either pumps or motors. These machines 10 and 12 may be constructed such as those shown in U.S. Pat. Nos. 3,381,472 issued May 7, 1968 to C. Brown, et al. or U.S. Pat. No. 3,477,225 issued Nov. 11, 1969 to J.R. Cryder, et al. In the presently contemplated embodiment, the machines may be preferably an identical pair of hydraulic motors forming a part of a hydrostatic transmission system and each separately driving, for example, the separate track of a crawler vehicle.

The machines 10 and 12 are interconnected to operate together to provide speed control, both together and independently to provide straight line translation of the machine, and also to provide turning ability. The variable displacement of each of the machines is controlled be a servo valve. Each of the hydraulic machines 10 and 12 is provided with control means for adjusting the null or zero displacement of the servo valve mechanism. This adjusting mechanism is identical with respect to both machines and will be shown generally at 14 only with respect to the machine 12. It is to be understood that each pump and motor will have such a mechanism.

The servo control mechanism comprises, for example, a servo valve 16, mounted such as by a bracket 18 into the pump or motor housing.

The servo valve 16 is operatively connected to a control lever or arm 20 by means of an arm 22 and a bracket 24 having a pair of adjusting screws 26 and 28 for adjusting the servo valve with respect to the control arm 20. The spring 30 biases the arm 22 into engagement with the adjusting screw 26.

The relative position of the servo valve 16 may be adjusted with respect to the control lever 20 in order to provide a corresponding null or zero position. The adjustment may be accomplished by setting the control arm 20 in its preferred zero position and adjusting the servo valve 16 by means of adjusting screws 26 and 28 such that the servo valve is then in a corresponding zero position. This procedure positions the servo valve within its cooperating servo sleeve or housing to a position that signals or actuates the pump or motor to a null displacement position.

The two machines 10 and 12 are interconnected by control means which provides for a sensitivity or gain adjustment of the two pump servo valves to control the synchronization between the two machines. Each of the machines is provided with a sensitivity or gain adjustment mechanism generally designated by the numeral 32. These are identical in construction and thus, only one will be described in detail with reference numerals applied to both.

The gain or sensitivity adjustment mechanism generally conprises a steering cylinder or motor 34 carried by a supporting bracket 36 which in turn is pivotally mounted such as by means of a pin 38 from a fixed portion of the machine. The pivotally mounted bracket 36 and cylinder 34 together act as a lever or bellcrank for operatively connecting a speed control motor 40 to the control lever 20 by means of a rod or link 42. The rod or link 42 is pivotally connected to the bracket 36 by means of a pin 44 slidably disposed in a slot 46 of the bracket. The lever arm formed between pivots 38 and pin 44 is adjustable by means of an adjusting screw 48 carried on the bracket 36. The pin 44 is moved along the arcuate slot 46 by means of a yoke 50 which is operatively connected to a piston 52 of the steering motor 34. The piston 52 is biased to a retracted position by means of a spring 54 disposed between shoulders 56 fixed to the motor housing, and shoulder 58 carried by the piston. This retracted position of the piston 52 also positions the pin 44 by means of yoke 50 against the adjusting screw 48 to maintain a preselected lever arm and eliminates slop or slack in the linkage due to wear and/or clearance.

A tie rod 60 operatively couples the two gain adjustment mechanisms 32 for simultaneous movement of the two interconnected servo valves by means of the speed control motor 40. The sensitivity or gain adjustment mechanisms are separately adjustable so that they may be synchronized for position correspondence. That is, so that both motors or pumps will be operated at the same R.P.M. or the same output so that the vehicle may maintain a straight line heading for various speed settings of the separate transmissions.

Steering is accomplished by changing the displacement of one of the machines with respect to the other. This change of displacement is accomplished by actuation of one of the pumps or motors 34 while maintaining the other motor and the speed control motor 40 at a constant adjustment. Pressurization of the steering motor is accomplished by introduction of hydraulic fluid into the chamber 62 for acting on piston 52, and movement of the piston in the cylinder moves the yoke 50 with respect to the bracket 36 carrying the pin 44 along arcuate slot 46. The movement of pin 44 along the arcuate slot 46 cams the pin 44 for movement of the rod 42 one way or the other and consequently, movement of the control lever 20.

The movement of the control lever 20 acts to reposition the servo control valve 16 and thus repositions the displacement control mechanism of the hydraulic machine 12. This action will cause the hydraulic machine 12, if it is a motor, for example, to speed up or slow down with respect to the machine 10. This results in a turn of the vehicle. On the other hand, considering the machine 10 and 12 to be pumps, this adjustment would increase or decrease the flow of one pump with respect to the other, resulting in an increase or decrease in output from that pump and consequently, an increase or decrease in the motor driven thereby. Hydraulic fluid is introduced into the chamber 62 by way of a conduit 64 formed in the bracket 64 and communicating therewith, and with conduit 66 in pin 38.

From the above description it can be seen that there is disclosed a control mechanism for interconnecting a plurality of hydrostatic transmissions and including means for adjusting and synchronizing the two transmissions.

While the present invention has been described with respect to a specific embodiment, it is to be understood that many changes and modifications may be made in the illustrated construction without departing from the spirit and scope of the present invention as defined in the appended claims.

We claim:

1. The combination of adjustable control means interconnecting a control element of a plurality of variable displacement hydraulic machines, said combination comprising:

a plurality of variable displacement hydraulic machines;

a servo control valve and actuating means disposed in each of said machines for controlling the displacement thereof;

a first pivotal control lever means for actuating the control valve actuating means of each of said machines;

means for adjustably connecting each of said control valve actuating means to each of said levers so that the null position of said valve can be adjusted with respect to said lever;

means including a pivotally mounted bellcrank connected to each control lever, each bellcrank including a slot means, a link member connecting each bellcrank to its respective control lever, said link member including a pin movable within said slot means, adjustment means for asjusting the position of said pin within said slot means;

a tie rod means interconnecting said bellcranks;

first hydraulic means operatively interconnected with all said bellcranks to simultaneously actuate said control valves; and, second hydraulic means connected to each said pin for selectively actuating one of said control valves with respect to the other of said control valves.

2. The combination of claim 1 wherein said second hydraulic means comprises a hydraulic ram carried by each of said bellcranks and includes yoke means connecting said ram to said pin to move said pin along said slot means.

3. The combination of claim 2 wherein said slot means intersects the pivot axis of said bellcrank and extends to both sides thereof;

said first hydraulic means is connected to said tie rod means.

4. The combination of claim 3 wherein said adjustment means is disposed at one end of said slot means to engage and position said pin with respect to said one end of said slot means; and spring means operatively connected to bias said pin toward said adjustment means.

* * * * *